United States Patent
Smit et al.

(10) Patent No.: US 10,000,379 B2
(45) Date of Patent: Jun. 19, 2018

(54) PROCESS FOR THE PREPARATION OF SYNGAS

(71) Applicant: SHELL OIL COMPANY, Houston, TX (US)

(72) Inventors: Ruben Smit, Amsterdam (NL); Gerald Sprachmann, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days. days.

(21) Appl. No.: 15/526,085

(22) PCT Filed: Nov. 3, 2015

(86) PCT No.: PCT/EP2015/075498
§ 371 (c)(1),
(2) Date: May 11, 2017

(87) PCT Pub. No.: WO2016/074976
PCT Pub. Date: May 19, 2016

(65) Prior Publication Data
US 2017/0327374 A1    Nov. 16, 2017

(30) Foreign Application Priority Data

Nov. 13, 2014 (EP) .................................. 14193059

(51) Int. Cl.
*C01B 3/38* (2006.01)
*C10G 2/00* (2006.01)

(52) U.S. Cl.
CPC .............. *C01B 3/382* (2013.01); *C01B 3/38* (2013.01); *C10G 2/32* (2013.01); *C01B 2203/0233* (2013.01); *C01B 2203/0244* (2013.01); *C01B 2203/0455* (2013.01); *C01B 2203/062* (2013.01); *C01B 2203/0883* (2013.01); *C01B 2203/1241* (2013.01); *C01B 2203/141* (2013.01)

(58) Field of Classification Search
CPC ............ C01B 3/382; C01B 2203/0233; C01B 2203/0244; C01B 2203/0844; C01B 2203/1035; C01B 2203/148; C01B 2203/82; C10G 2/32
See application file for complete search history.

(56) References Cited

U.S. PATENT DOCUMENTS

| 4,245,696 A | 1/1981 | Van der Lelij |
| 2004/0063797 A1 | 4/2004 | Aasberg-Petersen et al. |
| 2004/0181313 A1 | 9/2004 | Mohedas et al. |
| 2007/0004809 A1 | 1/2007 | Lattner et al. |

FOREIGN PATENT DOCUMENTS

| EP | 0774103 A1 | 5/1997 |
| EP | 1403216 A1 | 3/2004 |
| EP | 1845062 A1 | 10/2007 |
| WO | 0009441 A2 | 2/2000 |
| WO | 2004041716 A1 | 5/2004 |
| WO | 2005015105 A1 | 2/2005 |
| WO | 2010009718 A2 | 1/2010 |

OTHER PUBLICATIONS

Aasberg-Petersen et al., "Natural Gas to Synthesis Gas—Catalysts and Catalytic Processes", Journal of Natural Gas Science and Engineering, vol. 3, issue 2, May 2011, pp. 423-459.
Grabke, "Mechanisms and Prevention of Corrosion in Carbonaceous Gases", Materials Science Forum, vol. 369-372, Oct. 2001, pp. 101-108, XP055182438.
International Search Report and Written Opinion received for PCT Patent Application No. PCT/EP2015/075498, dated Feb. 2, 2016, 9 pages.

*Primary Examiner* — Jafar Parsa

(57) ABSTRACT

The invention is directed to a process for the preparation of a syngas comprising hydrogen and carbon monoxide from a methane comprising gas, which process comprises the steps of: (a) reacting the methane comprising gas with an oxidizing gas in an autothermal reformer to obtain a hot raw syngas comprising carbon monoxide and hydrogen; (b) cooling the hot raw syngas resulting from step (a) to obtain the syngas, wherein step (b) comprises cooling the hot raw syngas by indirect heat exchange against the methane comprising gas used in step (a) and wherein sulphur is added upstream of cooling step (b). The invention also relates to a process for the preparation of hydrocarbon products in which a feed syngas is prepared in the process as described above followed by a desulphurization treatment and the desulphurized syngas is subsequently converted into hydrocarbon products in a Fischer-Tropsch process.

8 Claims, No Drawings

PROCESS FOR THE PREPARATION OF SYNGAS

PRIORITY CLAIM

The present application is the National Stage (§ 371) of International Application No. PCT/EP2015/075498, filed Nov. 3, 2015, which claims priority from European Patent Application No. 14193059.4, filed Nov. 13, 2014 incorporated herein by reference.

FIELD OF THE INVENTION

The present invention relates to a process for the preparation of a syngas comprising hydrogen and carbon monoxide from a methane comprising gas and to a process for the production of hydrocarbon products from such syngas by means of a Fischer-Tropsch process.

BACKGROUND OF THE INVENTION

The expression "syngas" as used herein refers to synthesis gas, which is a common term to refer to gas mixtures comprising carbon monoxide and hydrogen.

The present invention specifically relates to a process for the preparation of syngas using an autothermal reformer (ATR). Such processes are well known in the art. Typically a feed gas comprising methane is contacted with an oxidizing gas in an ATR and the methane reacts with the oxidizing gas to form a raw syngas in an exothermic partial oxidation reaction. The heat generated in this process is largely contained in the hot raw syngas produced. For an optimum heat efficiency of the overall process the heat contained in the hot raw syngas can be recovered for use in the process by indirect heat exchange against water to produce steam (e.g. in a waste heat boiler) and/or by heat exchange against other process streams. For example, the use of so called feed/effluent heat exchangers is desirable, as this allows an effective heat integration. In such feed/effluent heat exchanger the hot syngas produced, typically after being passed through a waste heat boiler, is cooled against the methane-comprising gas feed from which the syngas is produced.

A problem generally encountered with recovering heat from the hot raw syngas by heat exchange, e.g. in a waste heat boiler and/or feed/effluent heat exchanger, is the corrosive nature of the raw syngas. The syngas side of the heat exchanger used is consequently prone to metal dusting corrosion. This can cause serious damage to the heat exchanger. Furthermore, the alloys used for such heat exchangers typically comprise metals such as iron, nickel and/or cobalt. The metal dust produced as a result of metal dusting corrosion, will accordingly comprise these metals which are known to catalyse the methanation reaction. Methanation is the formation of methane from hydrogen and carbon oxides and is an undesired side reaction in the production of syngas, not only because it reduces the amount of hydrogen and carbon monoxide in the syngas, but also because methanation is a strongly exothermic reaction and may cause local damage or failure of the syngas side of the heat exchanger if too much heat is accumulated.

One way to reduce metal dusting in a a reforming process using an ATR could be the addition of a small amount of sulphur to the effluent of feed of the ATR such as disclosed in US20040063797. The process disclosed in US20040063797 is a process in which synthesis gas is produced by combining endothermic adiabatic steam reforming with an ATR. The heat required for the endothermic adiabatic steam reforming step may (partly) be provided by the hot effluent from the ATR. The feed to the ATR, however, should still be heated separately to provide sufficient heat to effectively carry out the oxidation reaction in the ATR.

The addition of sulphur to the effluent of secondary reformer (essentially an ATR) prevent metal dusting is also described in WO2000009441, which discloses a similar process as described in US20040063797. The process as disclosed in WO2000009441 involves an endothermic primary reforming step followed by a secondary partial oxidation step. The primary reforming step takes place in a heat exchange reformer, in which the hot effluent from the secondary reformer transfers its heat to the primary reforming feed gas in the heat exchange reformer. Also in this process the feed to the secondary reformer (equivalent to the ATR) needs to be separately heated.

Another solution to prevent metal dusting may be to apply a coating to the metal surface inside the heat exchanger which is in direct contact with the hot raw syngas. Such coating is, for example, disclosed in WO2010009718. Alternatively, metal alloys specifically developed to withstand aggressive conditions may be used. However, applying a coating or using a specific metal alloy are expensive measures which will add substantially to the cost of the heat exchanger to be used, whilst their effect under the aggressive conditions caused by the hot raw syngas may still be limited.

The present invention aims to provide a more energy efficient syngas manufacturing process which at the same time effectively deals with problems of metal dusting and methanation. More specifically, the present invention aims to make heating of the ATR feed stream more effective, thereby increasing the heat efficiency of the overall syngas producing process, whilst at the same time preventing corrosion of the equipment used.

The present invention thus aims to achieve optimum heat integration, effective prevention of metal dusting corrosion and effective syngas production, both from a yield perspective and from a cost perspective.

SUMMARY OF THE INVENTION

The present invention relates to a process for the preparation of a syngas comprising hydrogen and carbon monoxide from a methane comprising gas, which process comprises the steps of:

(a) reacting the methane comprising gas with an oxidising gas in an autothermal reformer (ATR) to obtain a hot raw syngas comprising carbon monoxide and hydrogen;

(b) cooling the hot raw syngas resulting from step (a) to obtain the syngas, wherein step (b) comprises cooling the hot raw syngas by indirect heat exchange against the methane comprising gas used in step (a) and wherein sulphur is added upstream of cooling step (b).

It was found that the addition of sulphur significantly reduces the metal dusting and methanation, thereby enabling the use of a feed/effluent heat exchanger. Because methanation is effectively reduced, the conversion of the original methane comprising feed into syngas is more effective. Finally, by avoiding, or anyhow significantly reducing, the occurrence of the exothermic methanation reaction, the temperature at the syngas side of the heat exchanger will not exceed the design temperature of the metals used and hence damage to or even failure of the equipment can be avoided.

DETAILED DESCRIPTION OF THE INVENTION

In the process of the present invention the sulphur is added upstream of cooling step (b). The term "upstream" as used in this connection means that the sulphur is added to the gaseous process stream passing through the process before it is subjected to the one or more cooling treatments in step (b). In this way the sulphur added can effectively protect the cooling equipment against metal dusting and prevent methanation. Such cooling equipment would, for example, comprise a waste heat boiler to cool the hot syngas from the ATR against boiler feed water to produce steam, followed by a feed/effluent heat exchanger in which the methane comprising feed gas is heated by heat exchange against the hot syngas coming from the waste heat boiler.

In one embodiment the sulphur can be added to the methane comprising gas prior to reacting this gas with an oxidising gas in step (a). In this embodiment the sulphur would accordingly be added to the methane comprising gas before it enters the ATR. In this embodiment the temperature in the ATR should be sufficiently high to protect the reforming catalyst (typically nickel-based) against sulphur poisoning. This is, for example, disclosed in K. Aasberg-Petersen et al., *Journal of Natural Gas Science and Engineering* 3(2011), 423-459.

In another, more preferred, embodiment the sulphur is added to the hot raw syngas resulting from step (a), that is, to the hot raw syngas coming out of the ATR before it is subjected to cooling in step (b). In this embodiment the reforming catalyst in the ATR is anyhow not affected by the addition of sulphur, so that the ATR can be operated at lower temperatures. This embodiment is usually preferred. If the process line-up comprises a pre-reformer upstream of the ATR, then the sulphur should anyhow be added downstream of such performer in order to avoid poisoning the prereforming catalyst. The sulphur can be added in any form which can be safely and accurately dosed to a process gas stream without affecting the final product yield. Accordingly, the sulphur can, for example, be suitably added in the form of hydrogen sulphide ($H_2S$), sulphur dioxide, dimethyldisulphide, sulphuric acid or carbonyl sulphide (COS) using suitable dosing equipment. Such sulphur compounds may be dissolved in or diluted with a carrier liquid or gas, so that it can be accurately dosed, pumped and injected into the process gas stream. Suitable carrier liquids and gases are such liquids and gases which do not affect the yield of final product. For example, dimethyl disulphide may suitably be diluted with toluene, while $H_2S$ can suitably be diluted with steam of carbon monoxide. One relevant factor for determining the form in which the sulphur is added, is its removal further downstream in the process. At this sulphur removal stage the sulphur should have a form which can be effectively removed. Suitably this is $H_2S$ and/or COS, as these are sulphur compounds which can be effectively removed by well known means such as zinc oxide beds. Accordingly, if sulphur is added downstream of the the ATR it is preferably added in the form of $H_2S$ or COS, more preferably $H_2S$. If sulphur is added upstream of the ATR it can have any form which is converted into $H_2S$ and/or COS in the ATR, for example dimethyl disulphide.

If the natural gas feed to the ATR comprises sulphur and such natural gas stream is first subjected to a sulphur removal treatment before it is passed into the ATR, it is also possible to use a bypass stream of the natural gas feed as the source of sulphur. In this embodiment a small part of the natural gas feed stream bypasses the sulphur removal treatment and is fed to the hot syngas stream leaving the ATR. The sulphur present in the original natural gas stream in this way serves as the source of sulphur to protect the internals of a feed/effluent heat exchanger against metal dusting.

The amount of sulphur added should be sufficient to provide accurate protection of the cooling equipment against metal dusting and to prevent methanation occurring in such cooling equipment. Another important factor is the sulphur removal further downstream in the process: the less sulphur added, the less sulphur needs to be removed and the longer the sulphur removal beds can remain in operation. The amount of sulphur can vary within wide limits, but typically sulphur is added in an amount of between 50 ppb and 5 ppm, preferably between 100 ppb and 2 ppm and more preferably between 150 ppb and 1 ppm.

The autothermal reforming step (a) can be carried out according to methods and with equipment known in the art. Autothermal reforming is a well known process. In autothermal reforming the methane comprising gas reacts with the oxidising gas to produce syngas. The oxidising gas is suitably oxygen or an oxygen-containing gas. Examples of suitable gases include air (containing about 21 volume percent of oxygen) and oxygen-enriched air, which may contain at least 60 volume percent (% vol) oxygen, more suitably at least 80% vol and even at least 98% vol of oxygen. Such pure oxygen is preferably obtained in a cryogenic air separation process or by so-called ion transport membrane processes. The oxidising gas may also be steam. If an oxygen-containing gas is used, steam may be added in such amount that the steam to carbon (as hydrocarbon) molar ratio is suitably between 0.5 and 3.

An autothermal reformer or ATR typically comprises a burner, a combustion chamber and a catalyst bed in a refractory lined pressure shell. The burner is placed at the top of the pressure shell and extends into the combustion chamber which is located in the top section of the pressure shell. The catalyst bed is arranged below the combustion chamber. Examples of autothermal reforming processes and ATRs are e.g. disclosed in WO2004041716, EPA1403216 and US20070004809. The ATR used in step (a) may be any of the well-known ATRs which are commercially used.

Suitable reforming catalysts and arrangements for such catalysts which can be used in the ATR, are known in the art. Such catalysts typically comprise a catalytically active metal, suitably nickel, on a refractory oxide support such as ceramic pellets. Pellets, rings or other shapes of refractory oxide materials like zirconia, alumina or titania could also be used as support material. Further examples of suitable reforming catalysts are disclosed in US20040181313 and US20070004809.

The methane comprising gas used as feed to the ATR in step (a) suitably has a temperature in the range of from 500 to 850° C., more suitably 650 to 800° C., whilst the raw syngas leaving the ATR unit typically has a temperature in the range of from 950 to 1200° C., more suitably 970 to 1100° C. Operating pressures are typically between 20 and 60 bar, more suitably between 20 and 50 bar.

The methane comprising gas used as the feedstock to step (a) of the present process should contain a substantial amount of methane, i.e. more than 75% volume percent (% vol), preferably more than 90% vol and more preferably more than 94% vol of methane. Such methane comprising gas could be natural gas or associated gas with high methane content and low amounts, i.e. less than 1% vol of C2+ hydrocarbons. Such methane comprising gas could suitably be obtained by pre-reforming a methane comprising feed gas such as natural gas, associated gas or a mixture of $C_{1-4}$ hydrocarbons. Such methane comprising feed gas comprises mainly, i.e. more than 90% vol, especially more than 94% vol, $C_{1-4}$ hydrocarbons, and furthermore comprises at least 60% vol methane, preferably at least 75% vol and more preferably at least 90% vol methane. Very suitably natural gas is used as the methane comprising feed gas to the pre-reforming treatment. However, if the natural gas feed already has a low content of C2+ hydrocarbons, i.e. less than 1% vol, then a pre-reforming treatment may not be needed.

Pre-reforming of natural gas (or any other methane comprising feed gas) can be carried out by methods known in the art. Preferably, however, the pre-reforming of natural gas is carried out through a steam reforming treatment. In such steam reforming treatment natural gas and steam are mixed and heated to a temperature in the range of from 350 to 700° C., suitably 350 to 530° C., and the resulting natural gas/steam mixture is subsequently passed over a bed of a suitable steam reforming catalyst. The pressure at which such steam reforming treatment is performed is suitably between 20 and 60 bar and more suitably in the same range as the pressure in the ATR, that is, the pressure at which step (a) is performed. The steam to carbon ratio (as hydrocarbon and CO) in the pre-reformer is suitably between 0.3 and 0.8 and more suitably between 0.4 and 0.7.

Suitable steam reforming catalysts for use in the pre-reformer are known in the art. Typically such catalysts comprise a metal of the group consisting of nickel, platinum, palladium, ruthenium, iridium and cobalt on a refractory oxide support material. Examples of suitable catalyst are nickel on alumina catalysts and ruthenium on alumina, which are commercially available from several suppliers.

Steam reforming catalysts are generally highly sensitive to sulphur, so if the natural gas feed comprises sulphur compounds, then any sulphur present in the natural gas is first removed to levels of below 100 ppb, suitably below 10 ppb, before the natural gas is subjected to a steam reforming treatment.

Desulphurisation treatments are well known in the art. For example, at high sulphur levels the removal of sulphur could be performed by contacting the natural gas with a liquid mixture of a physical and chemical absorbent, typically in two steps: a first step to selectively remove $H_2S$ and a second step to remove remaining acid gases. The sulfolane extraction process is an example of such process. In addition to such desulphurisation treatment or at low sulphur levels in the natural gas, small amounts of sulphur may be removed by passing the natural gas through one or more beds of a suitable absorbent, for example zinc oxide, to absorb any $H_2S$ present. Often such absorption treatment is preceded by a hydrogenation treatment, wherein the natural gas is passed through a hydrogenation reactor to convert organic sulphur compounds into $H_2S$.

The steam reforming is suitably performed adiabatically. The (desulphurised) natural gas feed and steam are, accordingly, heated to the desired temperature and passed through a bed of the steam reforming catalyst. The C2+ hydrocarbons in the natural gas feed will react with steam to give carbon oxides and hydrogen. At the same time methanation of the carbon oxides with the hydrogen takes place to form methane. The net result is that the C2+ hydrocarbons are converted into methane with the formation of some hydrogen and carbon oxides. Some endothermic reforming of methane may also take place, but since the equilibrium at such low temperatures lies well in favour of the formation of methane, the amount of such methane reforming is small so that the pre-reformed natural gas product is a methane-rich gas. The heat required for the reforming of the C2+ hydrocarbons is provided by heat from the exothermic methanation of carbon oxides (formed by the steam reforming of methane and C2+ hydrocarbons) and/or from the sensible heat of the natural gas feed and steam fed to the bed of steam catalyst. The exit temperature will therefore be determined by the temperature and composition of the feedstock/steam mixture and may be above or below the inlet temperature. The conditions should be selected such that the exit temperature is lower than the limit set by the de-activation of the steam reforming catalyst. While some reforming catalysts are deactivated at temperatures above about 550° C., other catalysts that may be employed can tolerate temperatures up to about 700° C. Preferably the outlet temperature of the pre-reformed natural gas is between 350 and 530° C.

Cooling step (b) comprises cooling the hot raw syngas obtained in step (a) by indirect heat exchange against the methane comprising gas used as the feed to step (a). In this way the heat generated by the exothermic oxidation of methane in step (a) is used to preheat the feed to step (a). Such transfer of heat or heat exchange takes place in a suitable heat exchanger, in this case also referred to as a feed-effluent heat exchanger as the transfer of heat takes place from the effluent of the ATR to the feed of the same ATR. Examples of suitable feed-effluent heat exchangers would be shell and tube heat exchangers, plate and shell heat exchangers or plate fin heat exchangers. For the purpose of the present invention a shell and tube-type feed-effluent heat exchangers would be preferred, although the use of other types of heat exchangers is not excluded.

Feed/effluent heat exchangers are expensive pieces of equipment and if used, as in the process of the present invention, to cool hot corrosive gas streams, the internals of the heat exchanger should be made of special alloys with a high corrosion resistance and resistance to metal dusting. Such special alloys are extremely expensive.

Before the hot raw syngas enters the feed/effluent heat exchanger it is first reduced in temperature to below 800° C., more preferably to a temperature between 700 and 500° C. Such reduction in temperature is suitably attained by indirect heat exchange of the hot raw syngas against boiler feed water to produce steam, which can be used elsewhere in the process. Such indirect heat exchange against boiler feed water can be carried out in a waste heat boiler. Waste heat boilers are well known and commercially available from several suppliers. A few examples of waste heat boilers are described in WO2005015105, U.S. Pat. No. 4,245,696 and EPA0774103. Accordingly, in a preferred embodiment of the present invention step (b) comprises passing the hot raw syngas resulting from step (a) through a waste heat boiler to produce steam before further cooling the raw syngas by indirect heat exchange against the methane comprising gas used in step (a). In this way the heat efficiency of the syngas manufacturing process is further improved.

As described above, the presence of sulphur in the hot process gas stream provides adequate protection of those surfaces in the cooling equipment's internals which are in direct contact with the hot raw syngas. This allows the use of less expensive alloys for the cooling equipment and/or enables much longer operating times. This is obviously beneficial for the capital and operating costs of the process.

The syngas obtained after cooling in step (b) can be used for various purposes. For example, it can be used as a starting material for the production of methanol or other chemicals or it can be used in a Fischer-Tropsch synthesis reaction to produce hydrocarbon products. Before, however, using the syngas as a starting material in other processes, the sulphur added is suitably first removed by subjecting the syngas to a desulphurisation treatment to obtain a desulphurised syngas. Such desulphurisation treatment can be carried out by methods known in the art as described hereinbefore in connection with the methane comprising gas feed to the pre-reforming treatment. For example, desulphurisation of the syngas obtained in step (b) could suitably be attained by subjecting the syngas to a hydrogenation treatment to convert any sulphur and sulphur compounds into $H_2S$ followed by passing the resulting syngas stream over one or more zinc oxide beds to absorb the $H_2S$.

The present invention also relates to a process for the preparation of hydrocarbon products comprising the steps of:
(a) preparing a desulphurised feed syngas comprising hydrogen and carbon monoxide in a process as described above; and
(b) converting the desulphurised feed syngas into hydrocarbon products in a Fischer-Tropsch process.

The Fischer-Tropsch (FT) process is well known in the art as a catalytic process for synthesizing longer chain hydrocarbons from carbon monoxide and hydrogen. It may be operated in a single pass mode ("once through") or in a recycle mode and could involve a multi-stage conversion process, which may involve, two, three, or more conversion stages.

Fischer-Tropsch catalysts for use in the fixed bed catalyst beds of the syngas conversion reactor are known in the art, and typically include a Group 8 or 9 metal component, preferably Co, Fe and/or Ru, more preferably Co, on a suitable catalyst support material. Such support material could be a porous inorganic refractory oxide material, such as alumina, silica, titania, zirconia or mixtures thereof, but could also be an alternative support structure.

The Fischer-Tropsch synthesis is preferably carried out at a temperature in the range from 125° C. to 350° C., more preferably 175° C. to 275° C., most preferably 200° C. to 260° C. The pressure typically ranges from 15 to 150 bar, preferably from 30 to 100 bar and more preferably from 35 to 75 bar.

It will be understood that the skilled person is capable to select the most appropriate conditions for a specific reactor configuration and reaction regime.

Products of the Fischer-Tropsch synthesis may range from methane to heavy paraffinic waxes. Preferably, the production of methane is minimised and a substantial portion of the hydrocarbons produced have a carbon chain of at least 5 carbon atoms. Preferably, the amount of C5+ hydrocarbons is at least 60% by weight of the total product, more preferably, at least 70% by weight, even more preferably, at least 80% by weight, most preferably, at least 85% by weight.

EXAMPLE

Hot syngas of approximately of 1350° C. was passed into a heat exchanger with water as the cooling medium which led to a metal skin temperature of 550° C. on the syngas side of this heat exchanger. The inlet tube extending into the heat exchanger was made of Inconel® alloy 693. This is representative for the embodiment of the present invention in which hot raw syngas of 550° C. is passed into a feed/effluent heat exchanger via an inlet tube made of the same material (Inconel® alloy 693) with feed gas as the cooling medium.

Sulphur was present in the form of hydrogen sulphide in the hot syngas before the hot syngas entered the heat exchanger in an amount of 200 ppb sulphur.

In order to determine the effect of sulphur on metal dusting corrosion, the decrease in wall thickness was monitored during two consecutive periods of operation:
Period 1: 188 days of operation, of which 161 days with sulphur dosing and 27 days without sulphur dosing
Period 2: 160 days of operation, of which 50 days with sulphur dosing and 110 days without sulphur dosing.

The decrease in wall thickness ("wall loss") at the first bend of the inlet tube inside the heat exchanger was determined in both periods. The results are indicated in Table 1.

TABLE 1

| | Wall Loss | |
| --- | --- | --- |
| Exposure | Wall loss (mm) | Wall loss rate (mm/year) |
| Period 1 | 0.2 | 0.4 |
| Period 2 | 0.5 | 1.1 |

The results in Table 1 show the beneficial effect of the presence of sulphur in the hot syngas on reducing metal dusting.

That which is claimed is:

1. A process for the preparation of a syngas comprising hydrogen and carbon monoxide from a methane comprising gas, which process comprises the steps of:
(a) reacting the methane comprising gas with an oxidising gas in an autothermal reformer to obtain a hot raw syngas comprising carbon monoxide and hydrogen;
(b) cooling the hot raw syngas resulting from step (a) to obtain the syngas,
wherein step (b) comprises cooling the hot raw syngas by indirect heat exchange against the methane comprising gas used in step (a) and wherein sulphur is added upstream of cooling step (b).

2. The process according to claim 1, wherein the sulphur is added to the methane comprising gas prior to reacting this gas with an oxidizing gas in step (a).

3. The process according to claim 1, wherein the sulphur is added to the hot raw syngas resulting from step (a).

4. The process according to claim 1, wherein sulphur is added in an amount of between 50 ppb and 5 ppm.

5. The process according to claim 1, wherein step (b) comprises passing the hot raw syngas resulting from step (a) through a waste heat boiler to produce steam before further cooling the raw syngas by indirect heat exchange against the methane comprising gas used in step (a).

6. The process according to claim 1, wherein the methane comprising gas is obtained by pre-reforming a methane comprising feed gas.

7. The process according to claim 1, wherein the syngas obtained in step (b) is subjected to desulphurisation treatment to obtain a desulphurised syngas.

8. The process for the preparation of hydrocarbon products comprising the steps of:
(a) preparing a feed syngas comprising hydrogen and carbon monoxide in a process according to claim 7; and
(b) converting the feed syngas into hydrocarbon products in a Fischer-Tropsch process.

* * * * *